US012525185B2

(12) United States Patent
Yuan et al.

(10) Patent No.: US 12,525,185 B2
(45) Date of Patent: Jan. 13, 2026

(54) DISPLAY PANEL AND DISPLAY DEVICE

(71) Applicant: Xiamen Tianma Display Technology Co., Ltd., Xiamen (CN)

(72) Inventors: Yong Yuan, Xiamen (CN); Ping An, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/757,365

(22) Filed: Jun. 27, 2024

(65) Prior Publication Data

US 2024/0347006 A1 Oct. 17, 2024

(30) Foreign Application Priority Data

Jun. 30, 2023 (CN) ........................ 202310802078.4

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/08* (2013.01); *G09G 2320/0247* (2013.01); *G09G 2340/0435* (2013.01)

(58) Field of Classification Search
None
See application file for complete search history.

(56) References Cited

U.S. PATENT DOCUMENTS 11,468,814 B1 * 10/2022 Zhang ...................... G09G 3/20
2021/0104196 A1 * 4/2021 Yuan .................... G09G 3/3258
2021/0375192 A1 * 12/2021 Jeon ..................... G09G 3/3233
2022/0366841 A1 * 11/2022 Chen ........................ G09G 5/10
2023/0108303 A1 * 4/2023 Xie ...................... G09G 3/3233 345/690
2023/0178010 A1 * 6/2023 Yuan ........................ G09G 3/32 345/55
2024/0078972 A1 * 3/2024 Zhang .................. G09G 3/3233
2024/0221662 A1 * 7/2024 Kang ................... G09G 3/3233

FOREIGN PATENT DOCUMENTS

CN 114420032 A 4/2022

* cited by examiner

*Primary Examiner* — Dorothy Harris
(74) *Attorney, Agent, or Firm* — KDW Firm PLLC

(57) ABSTRACT

Provided are a display panel. When a bias adjustment control signal is an effective pulse signal, a bias adjustment module is on and provides a bias adjustment signal for a drive transistor. The data refresh rate of a first pixel circuit is a first frequency F1. The data refresh rate of a second pixel circuit is a second frequency F2. F1≠F2. A data refresh period of the first pixel circuit includes R1 image refresh frames. A data refresh period of the second pixel circuit includes R2 image refresh frames. The sum of time durations of effective pulses of the bias adjustment control signal is Ws1 in the data refresh period of the first pixel circuit. The sum of time durations of effective pulses of the bias adjustment control signal is Ws2 in the data refresh period of the second pixel circuit. Ws1/R1≠Ws2/R2.

20 Claims, 9 Drawing Sheets

DISPLAY PANEL AND DISPLAY DEVICE

CROSS-REFERENCE TO RELATED APPLICATION(S)

This application claims priority to Chinese Patent Application No. 202310802078.4 filed Jun. 30, 2023, the disclosure of which is incorporated herein by reference in its entirety.

TECHNICAL FIELD

The present application relates to the field of display technology and, in particular, to a display panel and a display device.

BACKGROUND

With the continuous development of display technology and the increasing demands of consumers for display panels, the display panels have been integrated with increasing functions. In some scenarios, for the same display panel, pixel circuits are required to have different display functions. For example, the pixel circuits are required to have different functions for the display of a game image and movie image and for the display of text and time information.

A pixel circuit is a key component in a display panel and plays an important role in providing a drive current for a light-emitting element of the display panel. When different pixel circuits of the display panel are required to have different display functions or display effects, the pixel circuits often need to be designed differentially in different regions. Therefore, how to design pixel circuits differentially according to the display functions or display effects of different pixel circuits in the display panel is a research hotspot in this field at present.

SUMMARY

Embodiments of the present application provide a display panel and a display device that can adjust pixel circuits differentially according to different requirements of the pixel circuits in the display panel so as to implement various functions of the pixel circuits in the display panel.

In a first aspect, an embodiment of the present application provides a display panel. The display panel includes pixel circuits and light-emitting elements.

A pixel circuit among the pixel circuits includes a drive module and a bias adjustment module.

The drive module includes a drive transistor.

A control terminal of the bias adjustment module receives a bias adjustment control signal. When the bias adjustment control signal is an effective pulse signal, the bias adjustment module is on and provides a bias adjustment signal for the drive transistor.

Working processes of the pixel circuits comprise a first mode and a second mode. A pixel circuit, among the pixel circuits, working in the first mode is a first pixel circuit. A pixel circuit, among the pixel circuits, working in the second mode is a second pixel circuit.

A data refresh rate of the first pixel circuit is a first frequency F1. A data refresh rate of the second pixel circuit is a second frequency F2. $F1 \neq F2$.

A data refresh period of the first pixel circuit includes R1 image refresh frames. A data refresh period of the second pixel circuit includes R2 image refresh frames. $R1 \geq 1$. $R2 \geq 1$.

A sum of time durations of effective pulses of the bias adjustment control signal is Ws1 in the data refresh period of the first pixel circuit. A sum of time durations of effective pulses of the bias adjustment control signal is Ws2 in the data refresh period of the second pixel circuit.

$$Ws1/R1 \neq Ws2/R2.$$

Based on the same inventive concept, in a second aspect, an embodiment of the present application further provides a display device. The display device includes the display panel described in the first aspect.

BRIEF DESCRIPTION OF DRAWINGS

Other features, objects and advantages of the present application will become more apparent after a detailed description of non-limiting embodiments with reference to the drawings below is read. The same or similar reference numerals denote the same or similar structures. The drawings are not drawn to actual scale.

DETAILED DESCRIPTION

Figure 1:
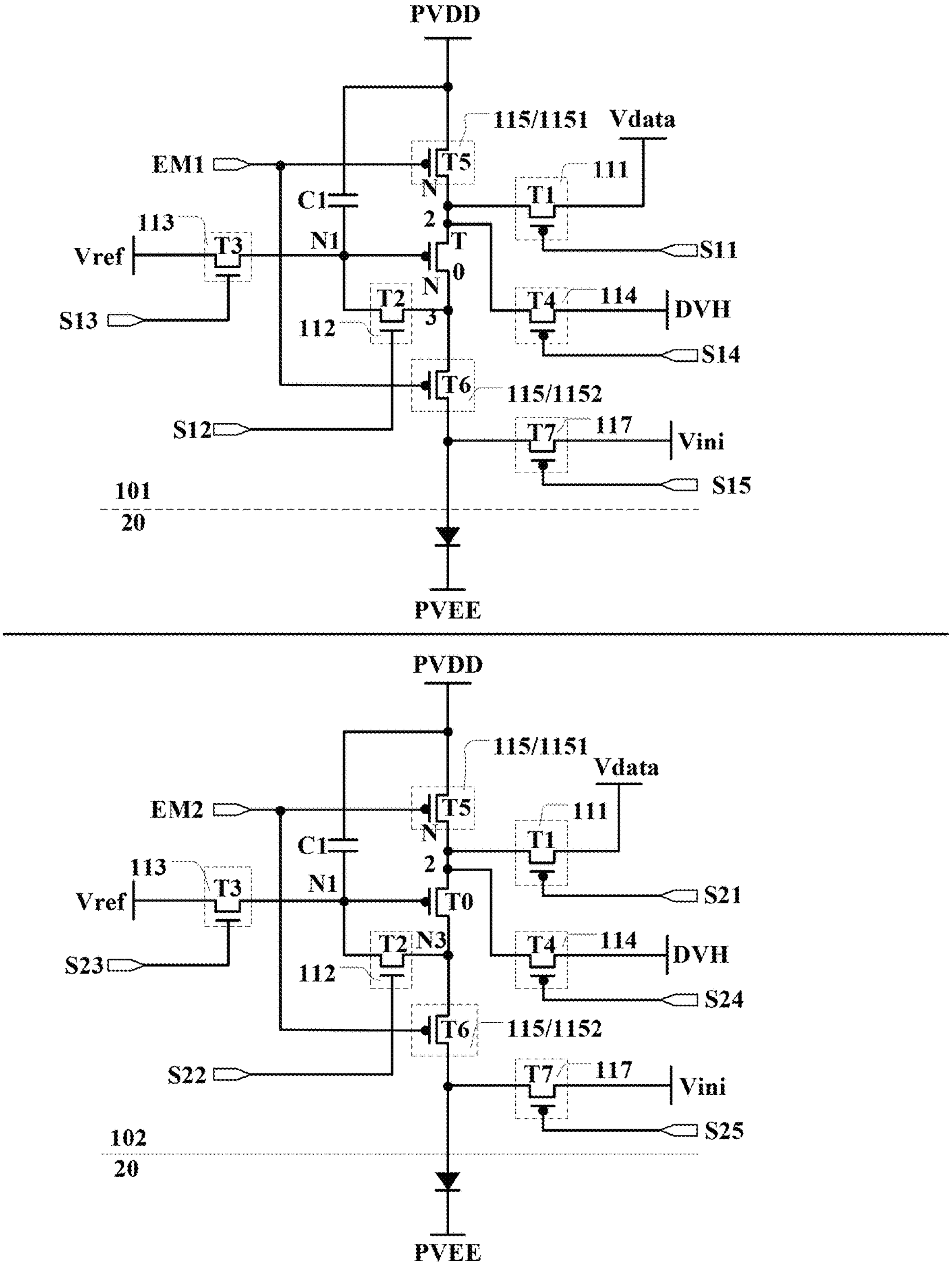
FIG. 1 is a diagram of a display panel according to an embodiment of the present application.

Features and example embodiments in various aspects of the present application are described hereinafter in detail. To provide a clearer understanding of the objects, technical solutions, and advantages of the present application, the present application is further described in detail in conjunction with drawings and embodiments. It is to be understood that the embodiments set forth below are configured to illustrate and not to limit the present application. To those skilled in the art, the present application may be implemented with no need for some of these specific details. The description of the embodiments hereinafter is intended only to provide a better understanding of the present application through examples of the present application.

It is to be noted that in this article, relationship terms such as a first and a second are used merely to distinguish one entity or operation from another. It does not necessarily require or imply any such actual relationship or order between these entities or operations. Furthermore, the term "comprising", "including" or any other variant thereof is intended to encompass a non-exclusive inclusion so that a process, method, article, or device that includes a series of elements not only includes the expressly listed elements but may also include other elements that are not expressly listed or are inherent to such process, method, article, or device. In the absence of more restrictions, the elements defined by the statement "including . . . " do not exclude the presence of additional identical elements in the process, method, article, or device that includes the elements.

It is to be understood that the term "and/or" used herein merely describes the association relationships between associated objects and indicates that three relationships may exist. For example, A and/or B may indicate three cases: A exists alone, A and B both exist, and B exists alone. In addition, the character "/" herein generally indicates that the front and rear associated objects are in an "or" relationship.

It is to be noted that when a component is described as being "connected to" another component, it may be directly connected to the particular component or one or more intervening components may be connected to the particular component.

It is apparent for those skilled in the art that various modifications and changes in the present application may be made without departing from the spirit or scope of the present application. Therefore, the present application is intended to cover modifications and variations of the present application that fall within the scope of the corresponding claims (the claimed technical solutions) and their equivalents. It is to be noted that the embodiments of the present application may be combined with each other if there is no contradiction.

Embodiments of the present application provide a display panel and a display device. Various embodiments of the display panel and the display device are described hereinafter in conjunction with the drawings.

In one aspect of embodiments of the present application, a display panel is provided. The display panel may be an organic light-emitting diode (OLED) display panel, a micro light-emitting diode (micro-LED) display panel, or a display panel in another type, which is not specially limited in this embodiment.

Referring to FIGS. 1 to 4, the display panel includes pixel circuits and light-emitting elements 20.

A pixel circuit is configured to drive a light-emitting element 20. The pixel circuit includes a drive module 110 and a bias adjustment module 114. The drive module 110 includes a drive transistor T0. A control terminal of the bias adjustment module 114 receives a bias adjustment control signal. When the bias adjustment control signal is an effective pulse signal, the bias adjustment module 114 is on and provides a bias adjustment signal DVH for the drive transistor T0.

Working processes of the pixel circuits 10 include a first mode and a second mode. A pixel circuit working in the first mode is a first pixel circuit 101. A pixel circuit working in the second mode is a second pixel circuit 102. For ease of distinguishing, in the drawings of the present application, a bias adjustment control signal received by a control terminal of a bias adjustment module 114 in the first pixel circuit 101 is marked as a first bias adjustment control signal S14, and a bias adjustment control signal received by a control terminal of a bias adjustment module 114 in the second pixel circuit 102 is marked as a second bias adjustment control signal S24.

In some cases, functional requirements for the first pixel circuit 101 and the second pixel circuit 102 may be reflected in the difference in data refresh rates. For example, the data refresh rate of the first pixel circuit 101 is a first frequency F1, and the data refresh rate of the second pixel circuit 102 is a second frequency F2. $F1 \neq F2$.

A data refresh period of the first pixel circuit 101 includes R1 image refresh frames. A data refresh period of the second pixel circuit 102 includes R2 image refresh frames. $R1 \geq 1$. $R2 \geq 1$.

The sum of time durations of effective pulses of first bias adjustment control signal S14 is Ws1 in the data refresh period of the first pixel circuit 101. The sum of time durations of effective pulses of second bias adjustment control signal S24 is Ws2 in the data refresh period of the second pixel circuit 102. $Ws1/R1 \neq Ws2/R2$.

In this embodiment, when the bias adjustment control signal is an effective pulse signal, the bias adjustment module 114 is on and provides the bias adjustment signal DVH for the drive transistor T0. $Ws1/R1 \neq Ws2/R2$. The bias adjustment signal is a signal received by the pixel circuit for adjusting the bias state of the drive transistor. When the bias adjustment control signal is an effective pulse signal, the bias adjustment signal DVH is transmitted to the drive transistor T0. The time duration of the bias adjustment control signal being an effective pulse signal affects the adjustment duration of the bias state of the drive transistor. If drive transistors have different bias states due to the fact that the first pixel circuit 101 and the second pixel circuit 102 implement different functions, different time durations of effective pulse signals of the bias adjustment control signal are required so as to adjust the bias state of a drive transistor in the first pixel circuit 101 and the bias state of a drive transistor in the second pixel circuit 102 separately, thereby facilitating the optimization of functions of different pixel circuits.

Figure 2:
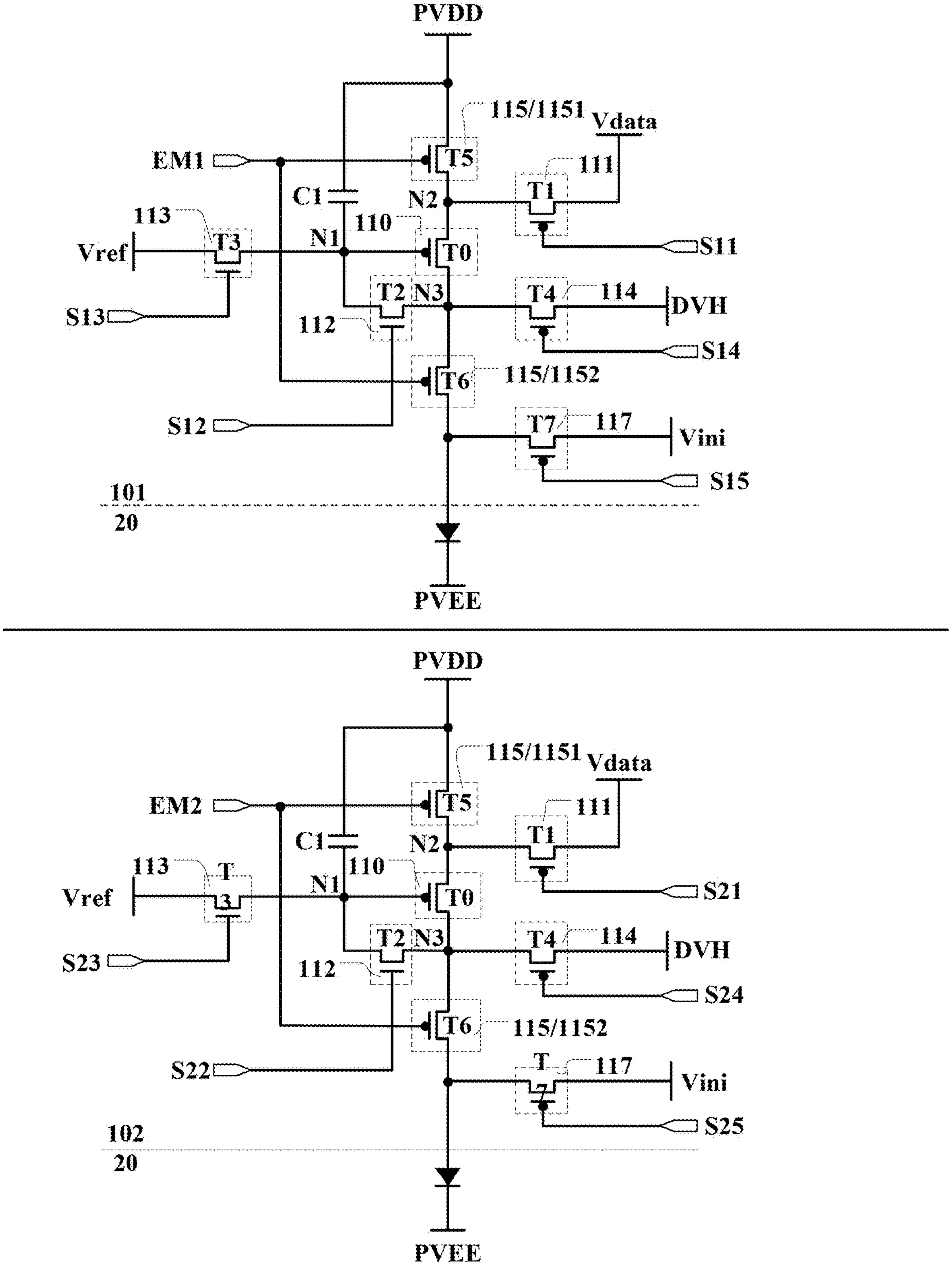
FIG. 2 is a diagram of another display panel according to an embodiment of the present application.
Figure 3:
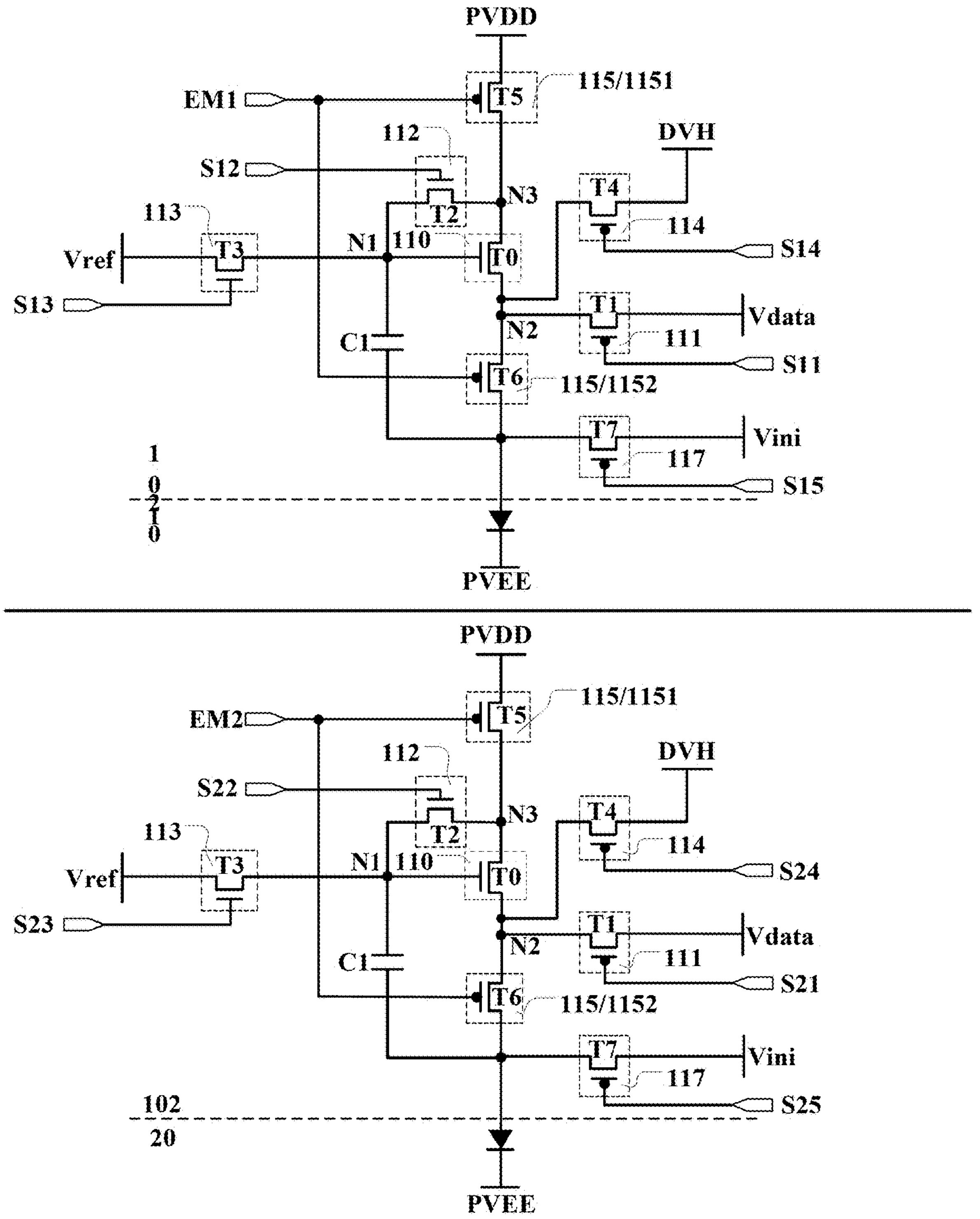
FIG. 3 is a diagram of another display panel according to an embodiment of the present application.
Figure 4:
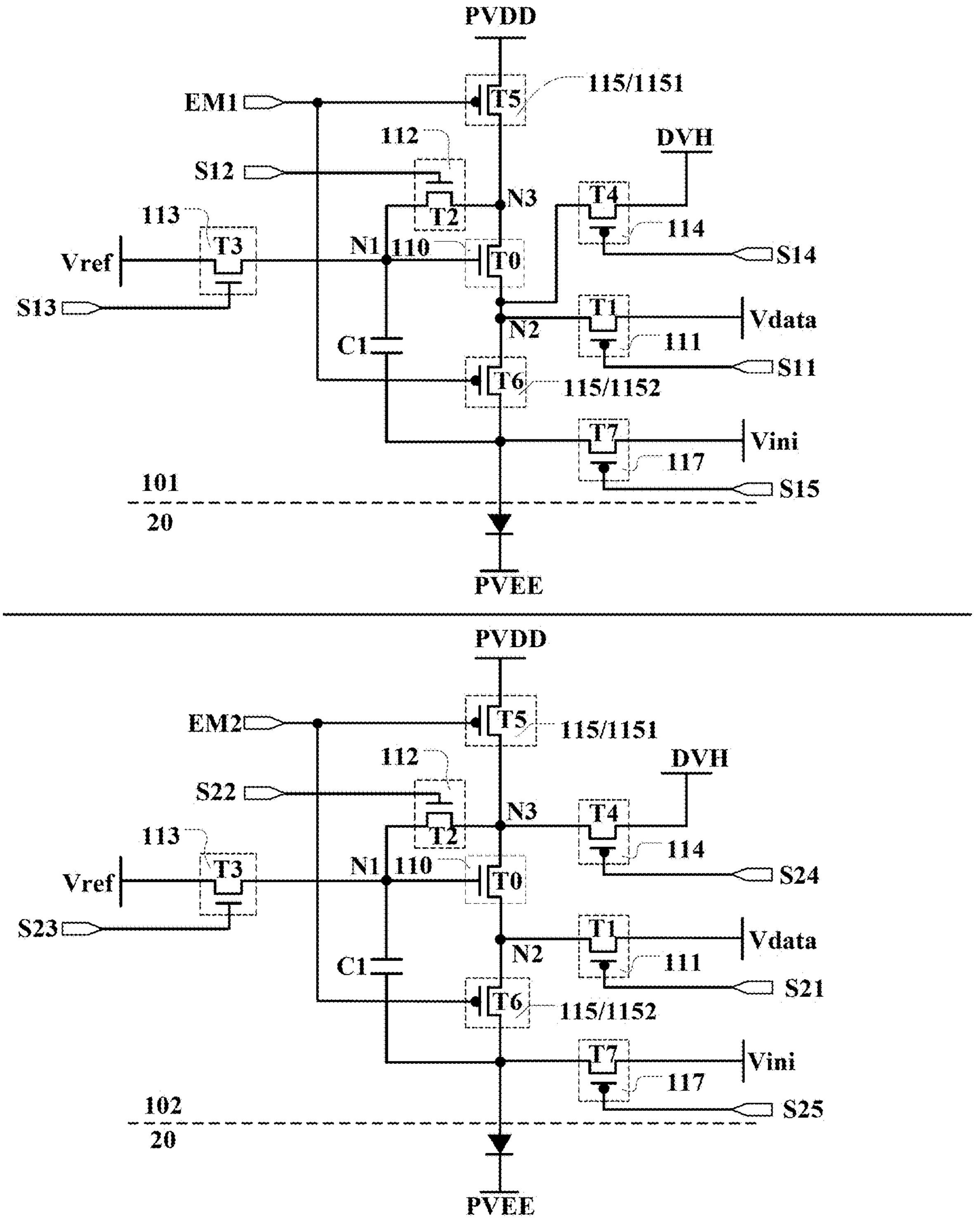
FIG. 4 is a diagram of another display panel according to an embodiment of the present application.

It is to be noted that as shown in FIGS. 1 and 2, the drive transistor T0 is a p-type transistor. The bias adjustment module 114 is connected to a first electrode of the drive transistor T0 in FIG. 1. The bias adjustment module 114 is connected to a second electrode of the drive transistor T0 in FIG. 2. As shown in FIGS. 3 and 4, the drive transistor T0 is an n-type transistor. The bias adjustment module 114 is connected to the first electrode of the drive transistor T0 in FIG. 3. The bias adjustment module 114 is connected to the second electrode of the drive transistor T0 in FIG. 4. When the drive transistor T0 is a p-type transistor, in a light emission stage, a signal applied to a gate of the drive transistor T0 is a data signal Vdata, a signal applied to the first electrode of the drive transistor T0 is a first power signal PVDD, and a signal of the second electrode of the drive transistor T0 may be a relatively-low-potential signal. In this case, the potential of the gate of the drive transistor T0 may be higher than the potential of the second electrode of the drive transistor T0. In this case, the p-type drive transistor T0 is on, and a reverse electric field may exist between the gate and the second electrode, causing carriers in an active layer of the drive transistor T0 to be polarized, thereby causing a threshold voltage drift of the drive transistor T0, and thus affecting the generation of a drive current. In order to improve this phenomenon, a bias adjustment signal at a relatively high level is input into the first electrode of the drive transistor T0 or the second electrode of the drive transistor T0 through the bias adjustment module 114 so that the potential of the first electrode or the potential of the second electrode is higher than the potential of the gate, thereby counteracting the problem of the preceding threshold voltage drift. When the drive transistor T0 is an n-type transistor, the case is similar. In the light emission stage, the potential of the gate of the n-type drive transistor T0 may be lower than the potential of the second electrode of the n-type drive transistor T0. A reverse electric field is formed in this case, thereby causing a threshold voltage drift of the drive transistor T0. Therefore, a bias adjustment signal at a relatively low level is input into the first electrode of the drive transistor T0 or the second electrode of the drive transistor T0 through the bias adjustment module 114 so that the potential of the first electrode or the potential of the second electrode is lower than the potential of the gate, thereby counteracting the problem of the preceding threshold voltage drift.

In some cases, a light-emitting element 20 driven by the first pixel circuit 101 may be configured to play images such as a movie and a game. In this case, the first pixel circuit 101 is required to have a relatively high data refresh rate so as to guarantee rapid image refreshing and improve user experience. A light-emitting element driven by the second pixel circuit 102 may be configured to display, for example, text and time information. In this case, the second pixel circuit 102 is not required to have a relatively high data refresh rate and can meet the requirements with a relatively low data refresh rate.

In some embodiments, $F1>F2$, and $Ws1/R1<Ws2/R2$.

In the display panel, generally, a frame refresh rate is a variation frequency of a subframe as a minimum unit for refreshing an image. A data refresh rate refers to a frequency with which data signals Vdata are written to the gate of the drive transistor T0. By way of example, a panel has a frame refresh rate of 120 Hz. When the data refresh rate is 60 Hz, it indicates that one data refresh period includes one data write frame and one retention frame. A data write frame refers to a subframe in which a data signal Vdata is written to the gate of the drive transistor T0. A retention frame refers to a subframe in which no data signal Vdata is written to the gate of the drive transistor T0. When the data refresh rate is 30 Hz, it indicates that one data refresh period includes one data write frame and three retention frames. The rest can be done in the same way. The data refresh rate of the first pixel circuit 101 is higher than the data refresh rate of the second pixel circuit 102. For example, the data refresh rate of the first pixel circuit 101 is 60 Hz, and the data refresh rate of the second pixel circuit 102 is 30 Hz. This is merely an example for description. In other cases, the data refresh rate of the first pixel circuit 101 and the data refresh rate of the second pixel circuit 102 may be set according to actual requirements.

A higher data refresh rate indicates a higher variation frequency of the potential of the gate of the drive transistor T0. The bias problem of the drive transistor T0 is closely related to the potential of the gate of the drive transistor T0 in the light emission stage. When the variation frequency of the potential of the gate of the drive transistor T0 is relatively high, the drive transistor T0 does not have the same reverse electric field for a long time. That is, the drive transistor T0 does not stay under the same bias problem for a long time. When the variation frequency of the potential of the gate of the drive transistor T0 is relatively low, the bias problem, if occurring, may exist for a relatively long time. Therefore, when the data refresh rate of the pixel circuit is relatively low, the bias problem may be more serious.

To solve this technical problem, in the case where $F1>F2$, the data refresh rate of the second pixel circuit 102 is relatively low, and the bias problem is relatively serious. $Ws1/R1<Ws2/R2$. In this case, the time duration of performing a bias adjustment for the second pixel circuit 102 may be relatively large. The relatively serious bias problem can be corrected through a relatively-long bias adjustment. The data refresh rate of the first pixel circuit 101 is relatively high, and the bias problem is relatively mild. In this case, the time duration of performing a bias adjustment for the first pixel circuit 101 may be relatively small.

In an embodiment, in the first case, in the same data refresh rate, the time duration of effective pulses of the bias adjustment control signal in a data write frame may be different from the time duration of effective pulses of the bias adjustment control signal in a retention frame; in different data refresh rates, the time duration of effective pulses of bias adjustment control signal in a data write frame may be the same; and in different data refresh rates, the time duration of effective pulses of the bias adjustment control signal in a retention frame may be the same.

In the second case, in the same data refresh rate, the time duration of effective pulses of the bias adjustment control signal in a data write frame may be the same as the time duration of effective pulses of the bias adjustment control signal in a retention frame; in different data refresh rates, the time duration of effective pulses of the bias adjustment control signal in a data write frame may be different; and in different data refresh rates, the time duration of effective pulses of the bias adjustment control signal in a retention frame may be different.

By way of example, the frame refresh rate is 120 Hz. $F1=60$ Hz. The data refresh rate of the first pixel circuit 101 is 60 Hz. One data refresh period of the first pixel circuit 101 may include one data write frame and one retention frame. $R1=2$. $F2=30$ Hz. The data refresh rate of the second pixel circuit 102 is 30 Hz. One data refresh period of the second pixel circuit 102 may include one data write frame and three retention frames. $R1=4$.

For example, in the first case, when the data refresh rate is 60 Hz or 30 Hz, the time duration of effective pulses of the bias adjustment control signal in a data write frame is 5 ms. The time duration of effective pulses of the bias adjustment control signal in a retention frame is 10 ms. In this case, $WS1=5+10=15$ ms. $WS2=5+3*10=35$ ms. $Ws1/R1=15/2$. $Ws2/R2=35/4$. Then $Ws1/R1<Ws2/R2$.

For example, in the second case, when the data refresh rate is 60 Hz, the time duration of effective pulses of the bias adjustment control signal in a data write frame is 5 ms. The time duration of effective pulses of the bias adjustment control signal in a retention frame is 5 ms. In this case, $WS1=5+5=10$ ms. When the data refresh rate is 30 Hz, the time duration of effective pulses of the bias adjustment control signal in a data write frame is 10 ms. The time duration of effective pulses of the bias adjustment control signal in a retention frame is 10 ms. In this case, $WS2=10+3*10=40$ ms. $Ws1/R1=10/2$. $Ws2/R2=10/4$. Then $Ws1/R1<Ws2/R2$.

Therefore, in different cases, when $F1>F2$, $Ws1/R1<Ws2/R2$.

It is to be noted that specific time-length values of effective pulses of the bias adjustment control signal in the preceding examples are merely some examples and are not intended to limit the present application.

In some embodiments, the R1 image refresh frames in the data refresh period of the first pixel circuit 101 include r1 data write frames and r2 retention frames. $r1\geq 1$. $r2>0$. The R2 image refresh frames in the data refresh period of the second pixel circuit include r3 data write frames and r4 retention frames. $r3\geq 1$. $r4>0$. The sum of time durations of effective pulses of the bias adjustment control signal in the r1 data write frames is Wr1. $Wr1/r1>0$. The sum of time durations of effective pulses of the bias adjustment control signal in the r2 retention frames is Wr2. $Wr2/r2\geq 0$. The sum of time durations of effective pulses of the bias adjustment control signal in the r3 data write frames is Wr3. Wr3/r3>0. The sum of time durations of effective pulses of the bias adjustment control signal in the r4 retention frames is Wr4. Wr4/r4≥0. At least two of Wr1/r1, Wr2/r2, Wr3/r3, or Wr4/r4 are not equal.

A data refresh period of one pixel circuit may include one or more data write frames and may include one or more retention frames. A data signal Vdata may be written to the gate of the drive transistor T0 in a data write frame, which refers to the change of a grayscale signal. Therefore, a relatively high ability of the gate of the drive transistor T0 to obtain a signal is required, and thus a relatively high stability of the drive transistor T0 is required. Therefore, the data write frame may include a bias adjustment stage. That is, in the data write frame, a bias adjustment control signal may include an effective pulse. Thus the bias state in the drive transistor may be adjusted through the bias adjustment signal to eliminate the phenomenon of a threshold voltage drift, thereby avoiding the problem of a flicker in a grayscale change.

As previously described, in a retention frame, no data signal Vdata is written to the gate of the drive transistor T0. However, when the data refresh rate of the display panel is relatively low, that is, when one data refresh period includes a relatively great number of retention frames, the bias phenomenon of the drive transistor that is in the retention frames for a long time may be increasingly serious. If no bias adjustment stage is set in a retention frame, the problem of a threshold voltage drift of the drive transistor T0 may be relatively serious. In order to avoid such a phenomenon, a bias adjustment stage may be set in the retention frame. That is, in the retention frame, a bias adjustment control signal may include an effective pulse.

It is to be understood that R1=r1+r2, that Ws1=Wr1+Wr2, that R2=r3+r4, and that Ws2=Wr3+Wr4. In the case where at least two of Wr1/r1, Wr2/r2, Wr3/r3, or Wr4/r4 are not equal, Ws1/R1≠Ws2/R2.

In some embodiments, Wr1/r1≠Wr2/r2. Moreover/alternatively, Wr3/r3≠Wr4/r4.

If the drive transistor of the first pixel circuit 101 has different bias states in a data write frame and in a retention frame in order to implement different functions in the data write frame and in the retention frame, different time durations of effective pulse signals of the bias adjustment control signal are required. For example, Wr1/r1≠Wr2/r2. In this case, the bias state of the drive transistor of the first pixel circuit 101 in the data write frame and the bias state of the drive transistor of the first pixel circuit 101 in the retention frame may be adjusted separately, thereby facilitating the optimization of different functions of the first pixel circuit 101 in the data write frame and in the retention frame.

If the drive transistor of the second pixel circuit 102 has different bias states in a data write frame and in a retention frame in order to implement different functions in the data write frame and in the retention frame, different time durations of effective pulse signals of the bias adjustment control signal are required. For example, Wr3/r3≠Wr4/r4. In this case, the bias state of the drive transistor of the second pixel circuit 102 in the data write frame and the bias state of the drive transistor of the second pixel circuit 102 in the retention frame may be adjusted separately, thereby facilitating the optimization of different functions of the second pixel circuit 102 in the data write frame and in the retention frame.

As previously described, a data signal Vdata is written to the gate of the drive transistor T0 in a data write frame, and no data signal Vdata is written to the gate of the drive transistor T0 in a retention frame. In the working process of the pixel circuit, before the data signal Vdata is written to the gate of the drive transistor T0, the gate of the drive transistor T0 needs to be reset generally. After a data signal of the previous frame is reset to a fixed potential, the data signal Vdata is written, thereby preventing the data signal of the previous frame from interfering with the data signal Vdata of the current frame. Additionally, for the retention frame in which no data signal needs to be written, the gate of the drive transistor T0 does not need to be reset. The potential of the gate, after the data signal Vdata in the data write frame is written to the gate of the drive transistor T0, is maintained as the potential of the gate of the drive transistor T0 in the retention frame. That is, the potential of the gate of the drive transistor T0 may change in the data write frame and may stay unchanged in the retention frame. Therefore, the bias phenomenon of the drive transistor that is in the retention frames for a long time may be increasingly serious.

In an embodiment, Wr1/r1<Wr2/r2. Moreover/alternatively, Wr3/r3<Wr4/r4.

For the first pixel circuit 101, the bias problem in a retention frame is relatively serious compared with a data write frame. Wr1/r1<Wr2/r2. In this case, the time duration for performing a bias adjustment for the first pixel circuit 101 in the retention frame may be relatively large so that the relatively serious bias problem may be corrected through the relatively-long-time bias adjustment.

For the second pixel circuit 102, the bias problem in a retention frame is relatively serious compared with a data write frame. Wr1/r1<Wr2/r2. In this case, the time duration for performing a bias adjustment for the second pixel circuit 102 in the retention frame may be relatively large so that the relatively serious bias problem may be corrected through the relatively-long-time bias adjustment.

In an embodiment, F1>F2, and r2<r4. That is, the lower the data refresh rate, the greater the number of retention frames included in one data refresh period.

Additionally, r1=r3. Alternatively, r1≠r3.

In some embodiments, Wr1/r1≠Wr3/r3. Moreover/alternatively, Wr2/r2≠Wr4/r4.

If the drive transistor of the first pixel circuit 101 and the drive transistor of the second pixel circuit 102 have different bias states in data write frames in order to implement different functions in the data write frames, different time durations of effective pulse signals of the bias adjustment control signal are required. For example, Wr1/r1≠Wr3/r3. In this case, the bias state of the drive transistor of the first pixel circuit 101 in a data write frame and the bias state of the drive transistor of the second pixel circuit 102 in a data write frame may be adjusted separately, thereby facilitating the optimization of different functions of the first pixel circuit 101 and the second pixel circuit 102 in the data write frames.

If the drive transistor of the first pixel circuit 101 and the drive transistor of the second pixel circuit 102 have different bias states in retention frames in order to implement different functions in the retention frames, different time durations of effective pulse signals of the bias adjustment control signal are required. For example, Wr2/r2≠Wr4/r4. In this case, the bias state of the drive transistor of the first pixel circuit 101 in a retention frame and the bias state of the drive transistor of the second pixel circuit 102 in a retention frame may be adjusted separately, thereby facilitating the optimization of different functions of the first pixel circuit 101 and the second pixel circuit 102 in the retention frames.

In some embodiments, F1>F2, and Wr1/r1<Wr3/r3. Moreover/alternatively, F1>F2, and Wr2/r2<Wr4/r4.

As previously described, a higher data refresh rate indicates a higher variation frequency of the potential of the gate of the drive transistor T0. The bias problem of the drive transistor T0 is closely related to the potential of the gate of the drive transistor T0 in the light emission stage. When the variation frequency of the potential of the gate of the drive transistor T0 is relatively high, the drive transistor T0 does not have the same reverse electric field for a long time. That is, the drive transistor T0 does not stay under the same bias problem for a long time. When the variation frequency of the potential of the gate of the drive transistor T0 is relatively low, the bias problem, if occurring, may exist for a relatively long time. Therefore, when the data refresh rate of the pixel circuit is relatively low, the bias problem may be more serious.

To solve this technical problem, in the case where F1>F2, the data refresh rate of the second pixel circuit 102 is relatively low, and the bias problem is relatively serious. Wr1/r1<Wr3/r3. In this case, the time duration of performing a bias adjustment for the second pixel circuit 102 in a data write frame may be relatively large. The relatively serious bias problem can be corrected through the relatively-long bias adjustment. The data refresh rate of the first pixel circuit 101 is relatively high, and the bias problem is relatively mild. In this case, the time duration of performing a bias adjustment for the first pixel circuit 101 in a data write frame may be relatively small. Moreover/alternatively, F1>F2, and Wr2/r2<Wr4/r4. In this case, the time duration of performing a bias adjustment for the second pixel circuit 102 in a retention frame may be relatively large. The relatively serious bias problem can be corrected through the relatively-long bias adjustment. The data refresh rate of the first pixel circuit 101 is relatively high, and the bias problem is relatively mild. In this case, the time duration of performing a bias adjustment for the first pixel circuit 101 in a retention frame may be relatively small.

As previously described, time durations of effective pulses of the bias adjustment control signal in different data write frames corresponding to different pixel circuits may be different.

In some embodiments, a data write frame in the data refresh period of the first pixel circuit 101 is a first data write frame. The sum of time durations of effective pulses of the bias adjustment control signal is Wd1 in one first data write frame. A data write frame in the data refresh period of the second pixel circuit 102 is a second data write frame. The sum of time durations of effective pulses of the bias adjustment control signal is Wd2 in one second data write frame. Wd1≠Wd2.

In some embodiments, F1>F2, and Wd1<Wd2.

When the data refresh rate of the pixel circuit is relatively low, the bias problem may be more serious. To solve this technical problem, in the case where F1>F2, the data refresh rate of the second pixel circuit 102 is relatively low, and the bias problem is relatively serious. Wd1<Wd2. In this case, the time duration of performing a bias adjustment for the second pixel circuit 102 in the second data write frame may be relatively large. The relatively serious bias problem can be corrected through the relatively-long bias adjustment. The data refresh rate of the first pixel circuit 101 is relatively high, and the bias problem is relatively mild. In this case, the time duration of performing a bias adjustment for the first pixel circuit 101 in the first data write frame may be relatively small.

In some embodiments, in order that Wd1≠Wd2, the number of effective pulses of the bias adjustment control signal in the first data write frame and the number of effective pulses of the bias adjustment control signal in the second data write frame may be adjusted; moreover/alternatively, the time duration of a single effective pulse of a bias adjustment control signal in the first data write frame and the time duration of a single effective pulse of a bias adjustment control signal in the second data write frame may be adjusted.

For example, one first data write frame includes xd1 effective pulses of the bias adjustment control signal. xd1≥1. The time duration of at least one effective pulse of the bias adjustment control signal is Wde1. One second data write frame includes xd2 effective pulses of the bias adjustment control signals. xd2≥1. The time duration of at least one effective pulse of the bias adjustment control signal is Wde2. xd1≠xd2. Moreover/alternatively, Wde1≠Wde2. Therefore, Wd1≠Wd2.

In some embodiments, F1>F2, and xd1<xd2. Moreover/alternatively, F1>F2, and Wde1<Wde2.

When the data refresh rate of the pixel circuit is relatively low, the bias problem may be more serious. To solve this technical problem, in the case where F1>F2, the data refresh rate of the second pixel circuit 102 is relatively low, and the bias problem is relatively serious. xd1<xd2. In this case, several bias adjustments may be performed for the second pixel circuit 102 in the second data write frame. The relatively serious bias problem can be corrected through a relatively great number of bias adjustments. The data refresh rate of the first pixel circuit 101 is relatively high, and the bias problem is relatively mild. In this case, the number of bias adjustments performed for the first pixel circuit 101 in the first data write frame may be appropriately small. Moreover/alternatively, in the case where F1>F2, the data refresh rate of the second pixel circuit 102 is relatively low, and the bias problem is relatively serious. Wde1<Wde2. In this case, the time duration of performing a single bias adjustment for the second pixel circuit 102 in the second data write frame may be relatively large. The relatively serious bias problem can be corrected through the relatively-long bias adjustment. The data refresh rate of the first pixel circuit 101 is relatively high, and the bias problem is relatively mild. In this case, the time duration of performing a single bias adjustment for the first pixel circuit 101 in the first data write frame may be relatively small.

Exemplarily, one data write frame may include one or more effective pulses of the bias adjustment control signal.

For example, F1=60 Hz. F2=30 Hz. xd1=2. xd2=3. Wde1=Wde2=5 ms.

In another example, F1=60 Hz. F2=30 Hz. xd1=xd2=2. Wde1=5 ms. Wde2=10 ms.

Of course, numerical values in the preceding examples are merely some examples and are not intended to limit the present application.

In some embodiments, F1>F2, and 1/3≤xd1/xd2<1. That is, the number of bias adjustments performed for the second pixel circuit 102 in the second data write frame may be up to three times the number of bias adjustments performed for the first pixel circuit 101 in the first data write frame.

In some embodiments, F1>F2, and 1/3≤Wde1/Wde2<1. That is, the time duration of a single bias adjustment performed for the second pixel circuit 102 in the second data write frame may be up to three times the time duration of a single bias adjustment performed for the first pixel circuit 101 in the first data write frame.

It is to be understood that for the first pixel circuit 101 and the second pixel circuit 102, the bias problem of a pixel circuit in a data write frame needs to be solved regarding a bias adjustment in the data write frame. The time duration of a non-light-emission stage in the data write frame is limited. If xd1/xd2 or Wde1/Wde2 is excessively small, the bias problem of the first pixel circuit 101 in the first data write frame may not be solved. F1>F2. 1/2≤xd1/xd2<1. Moreover/alternatively, 1/2≤Wde1/Wde2<1. Such an arrangement helps effectively solve the bias problem of the first pixel circuit 101 in the first data write frame and the bias problem of the second pixel circuit 102 in the second data write frame.

As previously described, time durations of effective pulses of the bias adjustment control signal in different retention frames corresponding to different pixel circuits may be different.

In some embodiments, a retention frame in the data refresh period of the first pixel circuit 101 is a first retention frame. The sum of time durations of effective pulses of the bias adjustment control signal is Wh1 in one first retention frame. A retention frame in the data refresh period of the second pixel circuit 102 is a second retention frame. The sum of time durations of effective pulses of the bias adjustment control signal is Wh2 in one second retention frame. Wh1≠Wh2.

In some embodiments, F1>F2, and Wh1<Wh2.

When the data refresh rate of the pixel circuit is relatively low, the bias problem may be more serious. To solve this technical problem, in the case where F1>F2, the data refresh rate of the second pixel circuit 102 is relatively low, and the bias problem is relatively serious. Wh1<Wh2. In this case, the time duration of performing a bias adjustment for the second pixel circuit 102 in the second retention frame may be relatively large. The relatively serious bias problem can be corrected through the relatively-long bias adjustment. The data refresh rate of the first pixel circuit 101 is relatively high, and the bias problem is relatively mild. In this case, the time duration of performing a bias adjustment for the first pixel circuit 101 in the first retention frame may be relatively small.

In some embodiments, in order that Wh1≠Wh2, the number of effective pulses of the bias adjustment control signal in the first retention frame and the number of effective pulses of the bias adjustment control signal in the second retention frame may be adjusted; moreover/alternatively, the time duration of a single effective pulse of a bias adjustment control signal in the first retention frame and the time duration of a single effective pulse of a bias adjustment control signal in the second retention frame may be adjusted.

For example, one first retention frame includes effective pulses of xh1 bias adjustment control signals. xh1≥1. The time duration of an effective pulse of at least one of the xh1 bias adjustment control signals is Whe1. One second retention frame includes effective pulses of xh2 bias adjustment control signals. xh2≥1. The time duration of an effective pulse of at least one of the xh2 bias adjustment control signals is Whe2. xh1≠xh2. Moreover/alternatively, Whe1≠Whe2. Therefore, Wh1≠Wh2.

In some embodiments, F1>F2, and xh1<xh2. Moreover/alternatively, F1>F2, and Whe1<Whe2.

When the data refresh rate of the pixel circuit is relatively low, the bias problem may be more serious. To solve this technical problem, in the case where F1>F2, the data refresh rate of the second pixel circuit 102 is relatively low, and the bias problem is relatively serious. xh1<xh2. In this case, several bias adjustments may be performed for the second pixel circuit 102 in the second retention frame. The relatively serious bias problem can be corrected through a relatively great number of bias adjustments. The data refresh rate of the first pixel circuit 101 is relatively high, and the bias problem is relatively mild. In this case, the number of bias adjustments performed for the first pixel circuit 101 in the first retention frame may be appropriately small. Moreover/alternatively, in the case where F1>F2, the data refresh rate of the second pixel circuit 102 is relatively low, and the bias problem is relatively serious. Whe1<Whe2. In this case, the time duration of performing a single bias adjustment for the second pixel circuit 102 in the second retention frame may be relatively large. The relatively serious bias problem can be corrected through the relatively-long bias adjustment. The data refresh rate of the first pixel circuit 101 is relatively high, and the bias problem is relatively mild. In this case, the time duration of performing a single bias adjustment for the first pixel circuit 101 in the first retention frame may be relatively small.

In some embodiments, F1>F2, and 1/3≤xh1/xh2<1. That is, the number of bias adjustments performed for the second pixel circuit 102 in the second retention frame may be up to three times the number of bias adjustments performed for the first pixel circuit 101 in the first retention frame.

In some embodiments, F1>F2, and 1/3≤Whe1/Whe2<1. That is, the time duration of a single bias adjustment performed for the second pixel circuit 102 in the second retention frame may be up to three times the time duration of a single bias adjustment performed for the first pixel circuit 101 in the first retention frame.

It is to be understood that for the first pixel circuit 101 and the second pixel circuit 102, the bias problem of a pixel circuit in a retention frame needs to be solved regarding a bias adjustment in the retention frame. The time duration of a non-light-emission stage in the retention frame is limited. If xh1/xh2 or Whe1/Whe2 is excessively small, the bias problem of the first pixel circuit 101 in the first retention frame may not be solved. F1>F2. 1/2≤xh1/xh2<1. Moreover/alternatively, 1/2≤Whe1/Whe2<1. Such an arrangement helps effectively solve the bias problem of the first pixel circuit 101 in the first retention frame and the bias problem of the second pixel circuit 102 in the second retention frame.

Figure 5:
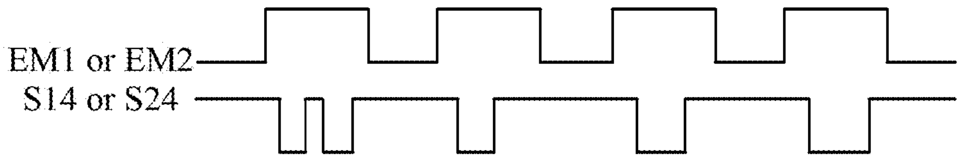
FIG. 5 is a timing diagram of a display panel according to an embodiment of the present application.

In some embodiments, for at least one of the first pixel circuit 101 or the second pixel circuit 102, a data refresh period of a pixel circuit may include effective pulses of multiple bias adjustment control signals. As time goes on, the bias problem may become increasingly serious. In order to solve this problem, as shown in FIG. 5, an example is taken in which an effective pulse of a bias adjustment control signal is at a low level. Time durations of the effective pulses of the bias adjustment control signals may increase gradually.

Figure 6:
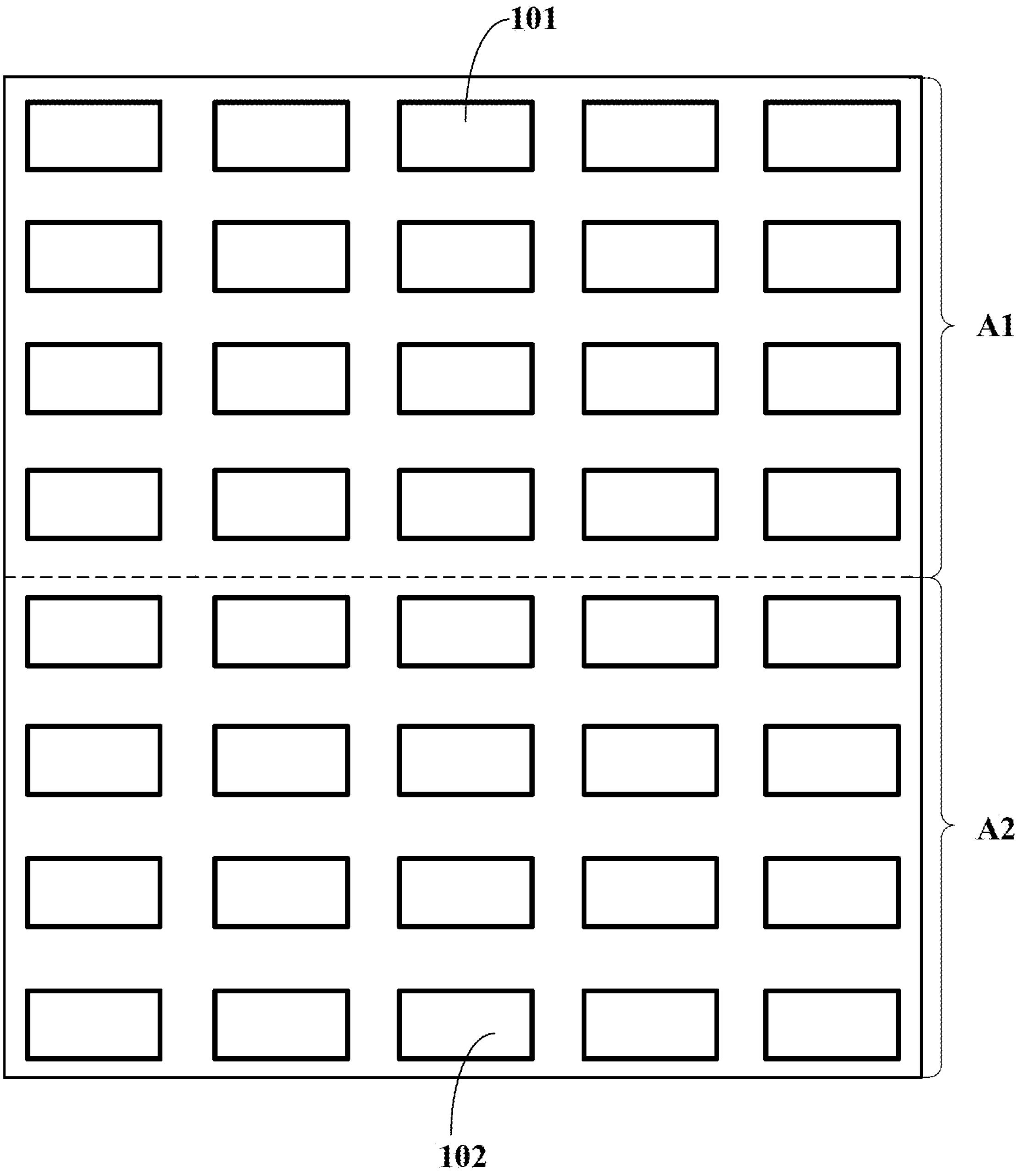
FIG. 6 is a diagram of another display panel according to an embodiment of the present application.

In some embodiments, the display panel may perform display based on different regions and different frequencies. For example, as shown in FIG. 6, the display panel includes a first display region A1 and a second display region A2. The first pixel circuit 101 is located in the first display region A1. The second pixel circuit 102 is located in the second display region A2.

The data refresh rate of the first pixel circuit 101 is the first frequency F1. The data refresh rate of the second pixel circuit 102 is the second frequency F2. F1/F2. The first display region A1 and the second display region A2 may perform display based on different refresh rates.

For example, F1>F2. The first display region A1 may display, for example, a game image and a movie image with a relatively high refresh rate. The second display region A2 may display, for example, text and time information with a relatively low refresh rate.

In some other embodiments, the display panel may perform display based on different periods and different frequencies. The display panel may include a first data refresh stage and a second data refresh stage. The first mode is the first data refresh stage. The second mode is the second data refresh stage. The data refresh rate of the first data refresh stage is the first frequency F1. The data refresh rate of the second data refresh stage is the second frequency F2.

Figure 7:
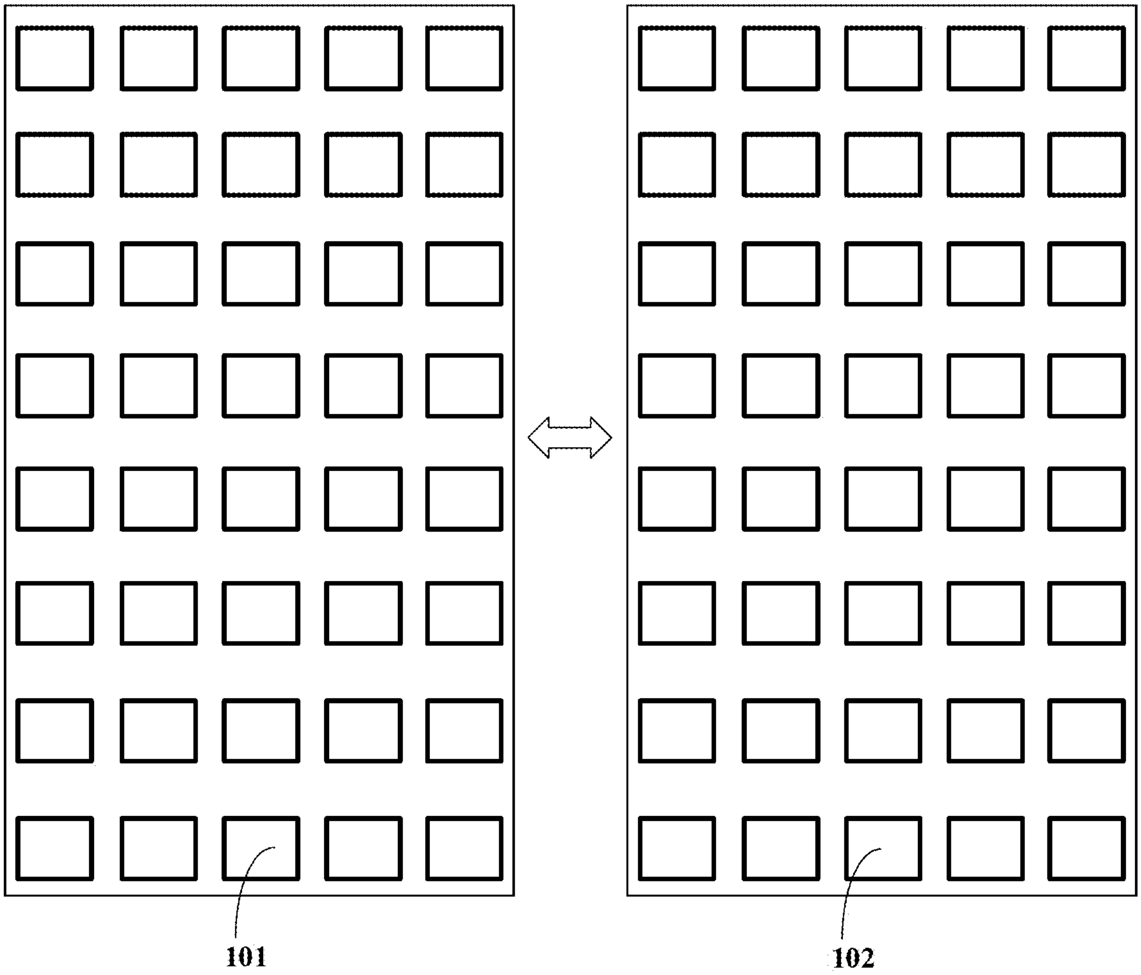
FIG. 7 is a diagram of another display panel according to an embodiment of the present application.

The same pixel circuit may perform display based on different periods and different frequencies. As shown in FIG. 7, each pixel circuit of the display panel may be a first pixel circuit 101 in the first data refresh stage and may be a second pixel circuit 102 in the second data refresh stage.

In some embodiments, as shown in FIGS. 1 to 4, the pixel circuit includes a data write module 111. The data write module is configured to provide the data signal Vdata for the drive transistor T0. An image refresh frame is a data write frame or a retention frame. In the data write frame, the data write module 111 writes the data signal Vdata to the gate of the drive transistor T0. In the retention frame, the data write module 111 does not write the data signal Vdata to the gate of the drive transistor T0.

In some embodiments, as shown in FIGS. 1 to 4, the pixel circuit includes the data write module 111. The data write module 111 is connected to the first electrode (node N2) of the drive transistor T0. The bias adjustment module 114 is connected to the first electrode (node N2) of the drive transistor or the second electrode (node N3) of the drive transistor T0.

The working process of the display panel includes a data write stage and a bias adjustment stage.

In the data write stage, the data write module 111 is on. The bias adjustment module 114 is off. The data write module 111 provides the data signal Vdata for the drive transistor T0. In the bias adjustment stage, the bias adjustment module 114 is on. The data write module 111 is off. The bias adjustment module 114 provides the bias adjustment signal DVH for the drive transistor T0.

In an embodiment, in this embodiment, a control terminal of a data write module 111 in the first pixel circuit 101 receives a scan signal S11. The scan signal S11 controls the on and off of the data write module 111 in the first pixel circuit 101. The control terminal of the bias adjustment module 114 in the first pixel circuit 101 receives the bias adjustment signal S14. The bias adjustment signal S14 controls the on and off of the bias adjustment module 114 in the first pixel circuit 101. A control terminal of a data write module 111 in the second pixel circuit 102 receives a scan signal S21. The scan signal S21 controls the on and off of the data write module 111 in the second pixel circuit 102. The control terminal of the bias adjustment module 114 in the second pixel circuit 102 receives the bias adjustment signal S24. The bias adjustment signal S24 controls the on and off of the bias adjustment module 114 in the second pixel circuit 102.

Figure 8:
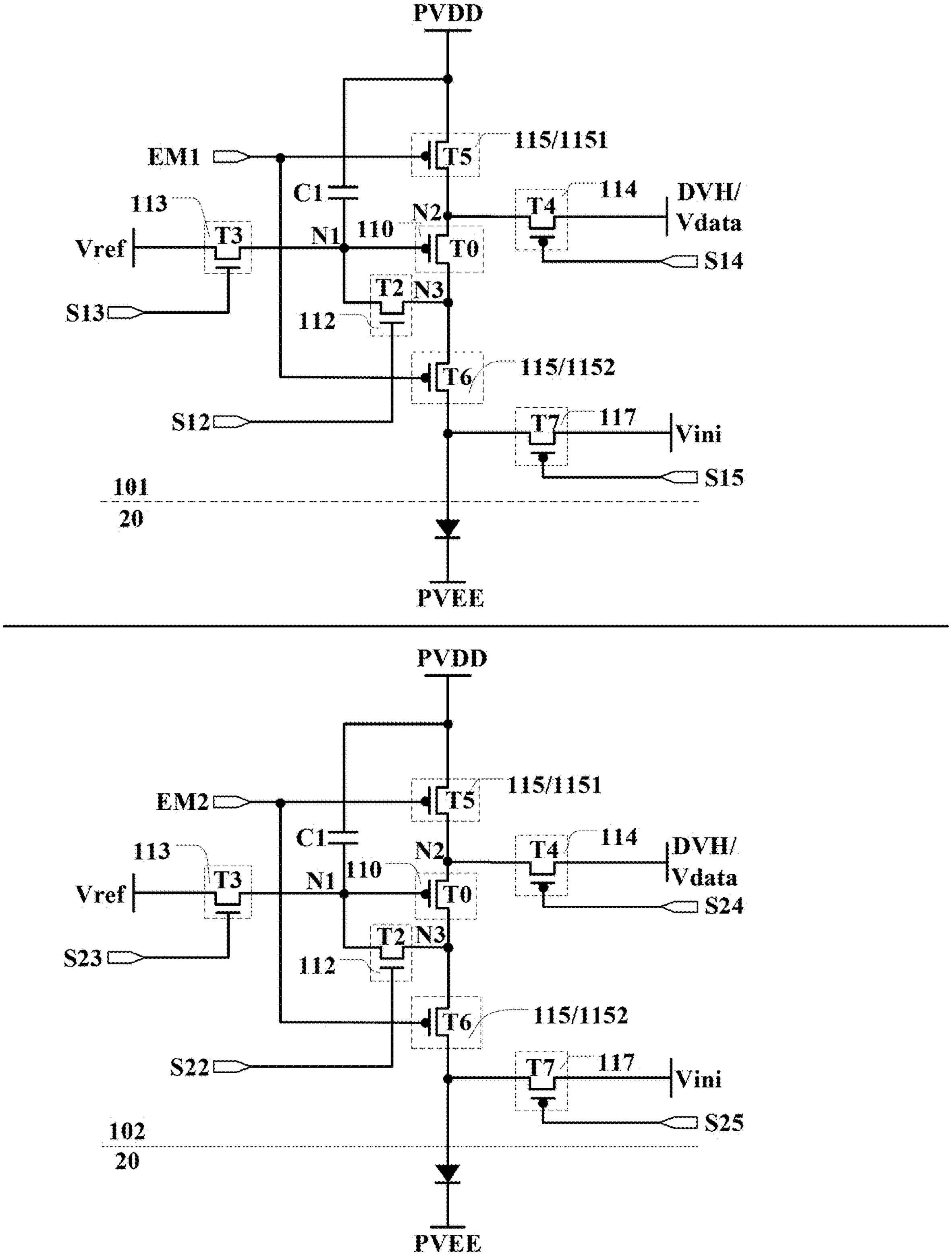
FIG. 8 is a diagram of another display panel according to an embodiment of the present application.
Figure 9:
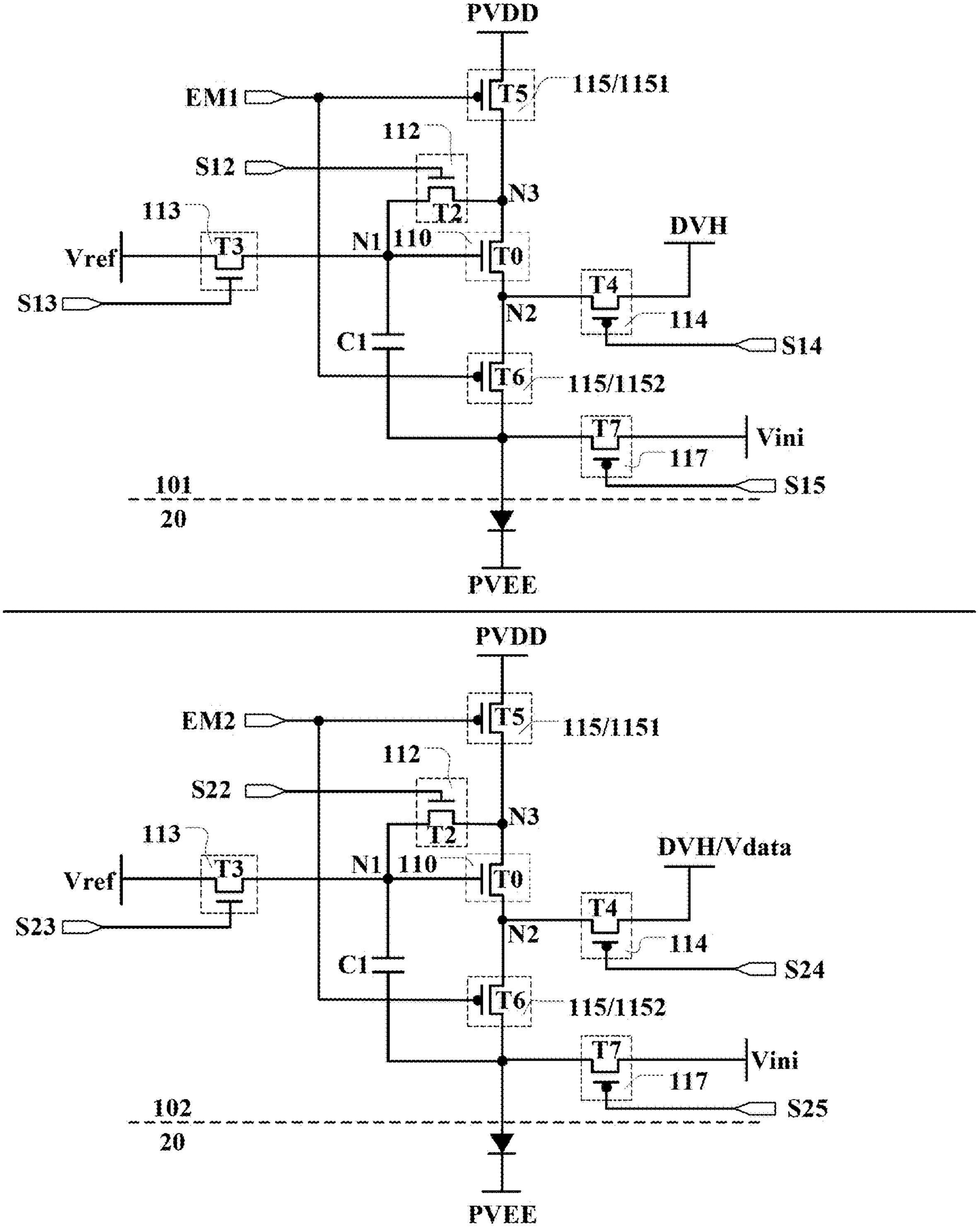
FIG. 9 is a diagram of another display panel according to an embodiment of the present application.

In some other embodiments, as shown in FIGS. 8 and 9, the bias adjustment module 114 also serves as a data write module. The working process of the display panel includes the data write stage and the bias adjustment stage. In the data write stage, the bias adjustment module 114 is on and provides the data signal Vdata for the drive transistor T0. In the bias adjustment stage, the bias adjustment module 114 is on and provides the bias adjustment signal DVH for the drive transistor T0.

In this embodiment, the bias adjustment module 114 may transmit both the bias adjustment signal DVH and the data signal Vdata to the drive transistor T0.

In an embodiment, in this embodiment, the control terminal of the bias adjustment module 114 in the first pixel circuit 101 receives the bias adjustment signal S14. The bias adjustment signal S14 controls the on and off of the bias adjustment module 114 in the first pixel circuit 101. In the control of a first effective pulse of the bias adjustment signal S14, the bias adjustment module 114 in the first pixel circuit 101 is on to provide the bias adjustment signal DVH for the drive transistor T0. In the control of a second effective pulse of the bias adjustment signal S14, the bias adjustment module 114 in the first pixel circuit 101 is on to provide the data signal Vdata for the drive transistor T0. The control terminal of the bias adjustment module 114 in the second pixel circuit 102 receives the bias adjustment signal S24. The bias adjustment signal S24 controls the on and off of the bias adjustment module 114 in the second pixel circuit 102. In the control of a first effective pulse of the bias adjustment signal S24, the bias adjustment module 114 in the first pixel circuit 102 is on to provide the bias adjustment signal DVH for the drive transistor T0. In the control of a second effective pulse of the bias adjustment signal S24, the bias adjustment module 114 in the first pixel circuit 102 is on to provide the data signal Vdata for the drive transistor T0.

It is to be noted that as shown in FIG. 8, the drive transistor T0 is a p-type transistor. The bias adjustment module 114 is connected to the first electrode of the drive transistor T0. As shown in FIG. 9, the drive transistor T0 is an n-type transistor. The bias adjustment module 114 is connected to the first electrode of the drive transistor T0.

In some embodiments, as shown in FIGS. 1 to 4, 8, and 9, the pixel circuit further includes a reset module 113, an initialization module 117, a light emission control module 115, and a compensation module 112. The reset module 113 is configured to provide a reset signal Vref for the drive transistor T0. The initialization module 117 is configured to provide an initialization signal Vini for the drive transistor T0. The light emission control module 115 is configured to selectively allow the light-emitting element 20 to enter the light emission stage. The compensation module 112 is connected between the gate of the drive transistor T0 and the second electrode (node N3) of the drive transistor T0.

In an embodiment, the light emission control module 115 includes a first light emission control module 1151 and a second light emission control module 1152. The first light emission control module 1151 is connected between a first power signal terminal and the first electrode (as shown in FIGS. 1 and 2) of the drive transistor T0 or the second electrode (as shown in FIGS. 3 and 4) of the drive transistor T0 and configured to provide a first power signal PVDD for the drive transistor T0. The second light emission control module 1152 is connected between the first electrode (as shown in FIGS. 3 and 4) of the drive transistor T0 or the second electrode (as shown in FIGS. 1 and 2) of the drive transistor T0 and the light-emitting element 20 and configured to selectively allow the drive current to enter the light-emitting element 20. The on-off state of the light emission control module 115 controls whether the light-emitting element emits light or not. The process where the light-emitting element turns on and off exists in a period of one subframe. Therefore, generally, the on and off the light emission control module 115 need to remain consistent with the frequency of the subframe. Accordingly, the frequency variation of a control signal of the light emission control module 115 is different from the variation of the data refresh rate. In this embodiment, a control signal of a light emission control module 115 in the first pixel circuit 101 is EM1. A control signal of a light emission control module 115 in the second pixel circuit 102 is EM2.

In an embodiment, the data write module 111 may include a data write transistor T1. A gate of a data write transistor T1 in the first pixel circuit 101 is configured to receive a control signal S11. A gate of a data write transistor T1 in the second pixel circuit 102 is configured to receive a control signal S12.

In an embodiment, the bias adjustment module 114 may include a transistor T4. A gate of a transistor T4 in the first pixel circuit 101 is configured to receive the bias adjustment control signal S14. A gate of a transistor T4 in the second pixel circuit 102 is configured to receive the bias adjustment control signal S24.

In an embodiment, the compensation module 112 may include a compensation transistor T2. A gate of a compensation transistor T2 in the first pixel circuit 101 is configured to receive the control signal S12. A gate of a compensation transistor T2 in the second pixel circuit 102 is configured to receive the control signal S22.

In an embodiment, the reset module 113 may include a reset transistor T3. A gate of a reset transistor T3 in the first pixel circuit 101 is configured to receive a control signal S13. A gate of a reset transistor T3 in the second pixel circuit 102 is configured to receive a control signal S23.

In an embodiment, the initialization module 117 may include an initialization transistor T7. A gate of an initialization transistor T7 in the first pixel circuit 101 is configured to receive a control signal S15. A gate of an initialization transistor T7 in the second pixel circuit 102 is configured to receive a control signal S25.

In an embodiment, the first light emission control module 1151 includes a first light emission control transistor T5. The second light emission control module 1152 includes a second light emission control transistor T6. A gate of a first light emission control transistor T5 in the first pixel circuit 101 and a gate of a second light emission control transistor T6 in the first pixel circuit 101 are configured to receive a control signal EM1. A gate of a first light emission control transistor T5 in the second pixel circuit 102 and a gate of a second light emission control transistor T6 in the second pixel circuit 102 are configured to receive a control signal EM2.

It is to be noted that a transistor in embodiments of the present application may be an n-type transistor or a p-type transistor. For an n-type transistor, an on level is a high level, and an off level is a low level. That is, when the potential of a gate of the n-type transistor is at a high level, a first electrode of the n-type transistor and a second electrode of the n-type transistor turn on. When the potential of the gate of the n-type transistor is at a low level, the first electrode of the n-type transistor and the second electrode of the n-type transistor turn off. For a p-type transistor, an on level is a low level, and an off level is a high level. That is, when the potential of a gate of the p-type transistor is at a low level, a first electrode of the p-type transistor and a second electrode of the p-type transistor turn on. When the potential of the gate of the p-type transistor is at a high level, the first electrode of the p-type transistor and the second electrode of the p-type transistor turn off. During specific implementation, a gate of each of the preceding transistors is used as a control electrode. Moreover, according to the signal and type of the gate of each transistor, a first electrode of each transistor may be used as a source, and a second electrode of each transistor may be used as a drain. Alternatively, the first electrode of each transistor may be used as a drain, and the second electrode of each transistor may be used as a source. No distinction is made here. Additionally, in embodiments of the present application, an on level refers to any level that can make a transistor turn on, and an off level refers to any level that can make the transistor cut off/turn off.

Figure 10:
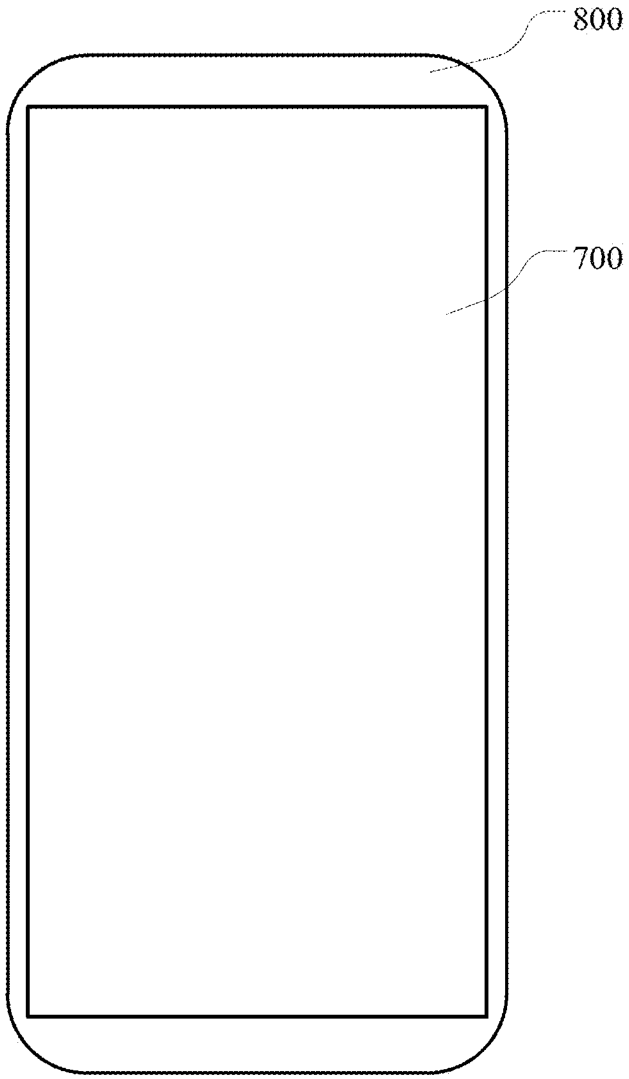
FIG. 10 is a diagram of a display device according to an embodiment of the present application.

The present application further provides a display device. The display device includes the display panel according to the present application. Referring to FIG. 10, FIG. 10 is a diagram of a display device according to an embodiment of the present application. The display device 1000 according to FIG. 10 includes a display panel 100. The display panel 100 may be a display panel described in any preceding embodiment. In the embodiment of FIG. 10, an example where the display device 1000 is a mobile phone is used for description. It is to be understood that the display device according to the embodiment of the present application may be a wearable product, a computer, a television, an in-vehicle display device, and another display device with a display function, which is not specifically limited in the present application. The display device according to the embodiment of the present application has the beneficial effects of the display panel according to the embodiment of the present application. For details, reference may be made to the specific description of the display panel in the preceding embodiments, and the details are not repeated here in this embodiment.

According to the preceding description, for the display panel and the display device according to the present application, the display panel includes pixel circuits and light-emitting elements 20. A pixel circuit includes a drive module 110 and a bias adjustment module 114. The drive module 110 includes a drive transistor T0. A control terminal of the bias adjustment module 114 receives a bias adjustment control signal. When the bias adjustment control signal is an effective pulse signal, the bias adjustment module 114 is on and provides a bias adjustment signal DVH for the drive transistor T0.

Working processes of the pixel circuits 10 include a first mode and a second mode. A pixel circuit working in the first mode is a first pixel circuit 101. A pixel circuit working in the second mode is a second pixel circuit 102.

For example, the data refresh rate of the first pixel circuit 101 is a first frequency F1, and the data refresh rate of the second pixel circuit 102 is a second frequency F2. $F1 \neq F2$.

A data refresh period of the first pixel circuit 101 includes R1 image refresh frames. A data refresh period of the second pixel circuit 102 includes R2 image refresh frames. $R1 \geq 1$. $R2 \geq 1$.

The sum of time durations of effective pulses of first bias adjustment control signals S14 is Ws1 in the data refresh period of the first pixel circuit 101. The sum of time durations of effective pulses of second bias adjustment control signals S24 is Ws2 in the data refresh period of the second pixel circuit 102. $Ws1/R1 \neq Ws2/R2$.

When the bias adjustment control signal is an effective pulse signal, the bias adjustment module 114 is on and provides the bias adjustment signal DVH for the drive transistor T0. $Ws1/R1 \neq Ws2/R2$. The bias adjustment signal is a signal received by the pixel circuit for adjusting the bias state of the drive transistor. When the bias adjustment control signal is an effective pulse signal, the bias adjustment signal DVH is transmitted to the drive transistor T0. The time duration of the bias adjustment control signal being an effective pulse signal affects the adjustment duration of the bias state of the drive transistor. If drive transistors have different bias states due to the fact that the first pixel circuit 101 and the second pixel circuit 102 implement different functions, different time durations of effective pulse signals of the bias adjustment control signal are required so as to adjust the bias state of a drive transistor in the first pixel circuit 101 and the bias state of a drive transistor in the second pixel circuit 102 separately, thereby facilitating the optimization of functions of different pixel circuits.

According to embodiments of the present application as described above, these embodiments do not describe all details, nor do they limit the present application to only the specific embodiments described. Apparently, many modifications and variations are possible in light of the preceding description. This specification selects and specifically describes these embodiments to better explain the principles and practical applications of the present application so that those skilled in the art can make good use of the present application and the modification based on the present application. The present application is limited only by the claims, along with the full scope and equivalents of the claims.

What is claimed is:

1. A display panel, comprising:

pixel circuits and light-emitting elements, wherein a pixel circuit among the pixel circuits comprises a drive module and a bias adjustment module;

the drive module comprises a drive transistor;

a control terminal of the bias adjustment module is configured to receive a bias adjustment control signal; and when the bias adjustment control signal is an effective pulse signal, the bias adjustment module is on and is configure to provide a bias adjustment signal for the drive transistor;

working processes of the pixel circuits comprise a first mode and a second mode; a pixel circuit, among the pixel circuits, working in the first mode is a first pixel circuit; and a pixel circuit, among the pixel circuits, working in the second mode is a second pixel circuit;

a data refresh rate of the first pixel circuit is a first frequency F1, and a data refresh rate of the second pixel circuit is a second frequency F2, wherein F1≠F2;

a data refresh period of the first pixel circuit comprises R1 image refresh frames, and a data refresh period of the second pixel circuit comprises R2 image refresh frames, wherein R1≥1, and R2≥1; and a sum of time durations of effective pulses of the bias adjustment control signal is Ws1 in the data refresh period of the first pixel circuit, and a sum of time durations of effective pulses of the bias adjustment control signal is Ws2 in the data refresh period of the second pixel circuit, wherein $$Ws1/R1 \neq Ws2/R2.$$

2. The display panel according to claim 1, wherein $$F1 > F2, \text{ and } Ws1/R1 < Ws2/R2.$$

3. The display panel according to claim 1, wherein the R1 image refresh frames in the data refresh period of the first pixel circuit comprise r1 data write frames and r2 retention frames, wherein r1≥1, and r2>0;

the R2 image refresh frames in the data refresh period of the second pixel circuit comprise r3 data write frames and r4 retention frames, wherein r3≥1, and r4>0;

a sum of time durations of effective pulses of the bias adjustment control signal in the r1 data write frames is Wr1, wherein Wr1/r1≥0;

a sum of time durations of effective pulses of the bias adjustment control signal in the r2 retention frames is Wr2, wherein Wr2/r2≥0;

a sum of time durations of effective pulses of the bias adjustment control signal in the r3 data write frames is Wr3, wherein Wr3/r3≥0; and a sum of time durations of effective pulses of the bias adjustment control signal in the r4 retention frames is Wr4, wherein Wr4/r4≥0;

wherein at least two of Wr1/r1, Wr2/r2, Wr3/r3, or Wr4/r4 are not equal.

4. The display panel according to claim 3, wherein Wr1/r1, Wr2/r2, Wr3/r3, and Wr4/r4 satisfy at least one of:

$$Wr1/r1 \neq Wr2/r2, \text{ or } Wr3/r3 \neq Wr4/r4.$$

5. The display panel according to claim 4, wherein Wr1/r1, Wr2/r2, Wr3/r3, and Wr4/r4 satisfy at least one of:

$$Wr1/r1 < Wr2/r2, \text{ or } Wr3/r3 < Wr4/r4.$$

6. The display panel according to claim 5, wherein $$F1 > F2, \text{ and } r2 < r4.$$

7. The display panel according to claim 3, wherein Wr1/r1, Wr3/r3, Wr2/r2, and Wr4/r4 satisfy at least one of:

$$Wr1/r1 \neq Wr3/r3, \text{ or } Wr2/r2 \neq Wr4/r4.$$

8. The display panel according to claim 7, wherein F1, F2, Wr1/r1, Wr3/r3, Wr2/r2, and Wr4/r4 satisfy at least one of:

$$F1 > F2, \text{ and } Wr1/r1 < Wr3/r3; \text{ or}$$

$$F1 > F2, \text{ and } Wr2/r2 < Wr4/r4.$$

9. The display panel according to claim 7, wherein a data write frame, among the r1 data write frames, in the data refresh period of the first pixel circuit is a first data write frame, and a sum of time durations of effective pulses of the bias adjustment control signal is Wd1 in one first data write frame; and a data write frame, among the r3 data write frames, in the data refresh period of the second pixel circuit is a second data write frame, and a sum of time durations of effective pulses of the bias adjustment control signal is Wd2 in one second data write frame, wherein Wd1≠Wd2.

10. The display panel according to claim 9, wherein $$F1 > F2, \text{ and } Wd1 < Wd2.$$

11. The display panel according to claim 9, wherein the one first data write frame comprises xd1 effective pulses of the bias adjustment control signal, wherein xd1≥1, wherein a time duration of at least one effective pulse of the bias adjustment control signal is Wde1; and the one second data write frame comprises xd2 effective pulses of the bias adjustment control signal, wherein xd2≥1, wherein a time duration of at least one effective pulse of the bias adjustment control signal is Wde2; wherein xd1, d2, Wde1, and Wde2 satisfy at least one of:

$$xd1 \neq xd2, \text{ or } Wde1 \neq Wde2.$$

12. The display panel according to claim 11, wherein F1, F2, xd1, d2, Wde1, and Wde2 satisfy at least one of:

$$F1 > F2, \text{ and } xd1 < xd2; \text{ or}$$

$$F1 > F2, \text{ and } Wde1 < Wde2.$$

13. The display panel according to claim 7, wherein a retention frame, among the r2 retention frames, in the data refresh period of the first pixel circuit is a first retention frame, and a sum of time durations of effective pulses of the bias adjustment control signal is Wh1 in one first retention frame; and a retention frame, among the r4 retention frames, in the data refresh period of the second pixel circuit is a second retention frame, and a sum of time durations of effective pulses of the bias adjustment control signal is Wh2 in one second retention frame, wherein Wh1≠Wh2.

14. The display panel according to claim 13, wherein $$F1 > F2, \text{ and } Wh1 < Wh2.$$

15. The display panel according to claim 13, wherein the one first retention frame comprises xh1 effective pulses of the bias adjustment control signal, wherein xh1≥1, wherein a time duration of at least one effective pulse of the bias adjustment control signal is Whe1; and the one second retention frame comprises xh2 effective pulses of the bias adjustment control signal, wherein xh2≥1, wherein a time duration of at least one effective pulse of the bias adjustment control signal is Whe2, wherein xh1, xh2, Whe1, and Whe2 satisfy at least one of: xh1≠xh2, or Whe1≠Whe2.

16. The display panel according to claim 15, wherein F1, F2, xh1, xh2, Whe1, and Whe2 satisfy at least one of:

$$F1 > F2, \text{ and } xh1 < xh2; \text{ or}$$

$$F1 > F2, \text{ and } Whe1 < Whe2.$$

17. The display panel according to claim 1, wherein the display panel comprises a first display region and a second display region, the first pixel circuit is located in the first display region, and the second pixel circuit is located in the second display region.

18. The display panel according to claim 1, wherein the pixel circuit comprises a data write module; the data write module is connected to a first electrode of the drive transistor; the bias adjustment module is connected to the first electrode of the drive transistor or a second electrode of the drive transistor; a working process of the display panel comprises a data write stage and a bias adjustment stage; in the data write stage, the data write module is on, the bias adjustment module is off, and the data write module provides a data signal for the drive transistor; and in the bias adjustment stage, the bias adjustment module is on, the data write module is off, and the bias adjustment module provides a bias adjustment signal for the drive transistor.

19. The display panel according to claim 1, wherein the bias adjustment module also serves as a data write module; a working process of the display panel comprises a data write stage and a bias adjustment stage; in the data write stage, the bias adjustment module is on and provides a data signal for the drive transistor; and in the bias adjustment stage, the bias adjustment module is on and provides a bias adjustment signal for the drive transistor.

20. A display device, comprising a display panel, wherein the display panel comprises: pixel circuits and light-emitting elements, wherein a pixel circuit among the pixel circuits comprises a drive module and a bias adjustment module; the drive module comprises a drive transistor; a control terminal of the bias adjustment module is configured to receive a bias adjustment control signal; and when the bias adjustment control signal is an effective pulse signal, the bias adjustment module is on and is configure to provide a bias adjustment signal for the drive transistor; working processes of the pixel circuits comprise a first mode and a second mode; a pixel circuit, among the pixel circuits, working in the first mode is a first pixel circuit; and a pixel circuit, among the pixel circuits, working in the second mode is a second pixel circuit; a data refresh rate of the first pixel circuit is a first frequency F1, and a data refresh rate of the second pixel circuit is a second frequency F2, wherein F1≠F2; a data refresh period of the first pixel circuit comprises R1 image refresh frames, and a data refresh period of the second pixel circuit comprises R2 image refresh frames, wherein R1≥1, and R2≥1; and a sum of time durations of effective pulses of the bias adjustment control signal is Ws1 in the data refresh period of the first pixel circuit, and a sum of time durations of effective pulses of the bias adjustment control signal is Ws2 in the data refresh period of the second pixel circuit, wherein $$Ws1/R1 \neq Ws2/R2.$$

* * * * *